United States Patent [19]
McMahan

[11] Patent Number: 5,845,165
[45] Date of Patent: Dec. 1, 1998

[54] RIFLE STYLE CAMERA

[76] Inventor: Charles B. McMahan, P.O. Box 110, Gakona, Ak. 99586

[21] Appl. No.: 862,759

[22] Filed: May 23, 1997

[51] Int. Cl.⁶ ..................................................... G03B 17/00
[52] U.S. Cl. .............................. 396/426; 348/64; 396/429
[58] Field of Search .................................. 396/426, 429; 348/64

[56] References Cited

U.S. PATENT DOCUMENTS

| | | |
|---|---|---|
| 3,709,124 | 1/1973 | Hunt . |
| 3,785,261 | 1/1974 | Ganteaume ............................... 396/426 |
| 4,630,911 | 12/1986 | Paul . |
| 4,835,621 | 5/1989 | Black . |
| 4,989,024 | 1/1991 | Myers . |
| 5,687,412 | 11/1997 | McIntyre ................................. 396/429 |

*Primary Examiner*—David M. Gray
*Attorney, Agent, or Firm*—Michael I. Kroll

[57] ABSTRACT

A rifle style camera supplied with power by an internal power supply for producing at least one of a photograph on a film material and digital data representative of an object. The rifle style camera includes a stalk and a barrel extending from the stalk and including a top side and a bottom side. A housing is connected to the bottom side of the barrel. A photographic camera for producing the photograph of the object on the film and a digital image processor including a memory device for capturing a digital image of the object, producing the digital data representative of the object from the captured digital image and storing said produced digital data in said memory device are positioned within the housing and connected to receive power from the internal power supply. An eyepiece and view finder are mounted to the top side of the barrel and connected to both the photographic camera and the digital image processor. A trigger shutter release is connected to the bottom side of the barrel and adjacent the housing. The trigger shutter release is operable between a first closed position in which the film is not exposed to light for capturing a photograph of the object thereon and a second open position for exposing the film to light for capturing the object on the film and initiating capture of an image representative of the object and production of digital data representative of the object by the digital image processor.

3 Claims, 7 Drawing Sheets

RIFLE STYLE CAMERA

BACKGROUND OF THE INVENTION

1. Field of the Invention

The instant invention relates generally to cameras and, more specifically, to a rifle style camera used for hunting and producing both photographs and three dimensional replicas of images viewed with the camera.

2. Description of the Prior Art

Numerous rifle style cameras have been provided in the prior art. For example, U.S. Pat. Nos. 3,709,124 to Hunt; 4,630,911 to Paul; 4,835,621 to Black; and 4,989,024 to Myers all are illustrative of such prior art. While these units may be suitable for the particular purpose to which they address, they would not be as suitable for the purposes of the present invention as heretofore described.

A simulated rifle has a small camera mounted in its receiver portion, and an image-splitting mirror mounted above the receiver splits the image received from a telescopic sight so that the photographer can sight through the mirror and telescopic sight while the image is simultaneously reflected by the mirror to the camera lens. The picture may be taken by pulling the trigger of the rifle, which is connected to the camera shutter.

A simulated firearm to be used in conjunction with a camera which includes features which are realistic to actual firearms but which can be used instead for purposes of photography. Such features include film storage chambers used in conjunction with a sliding bolt, a sliding focus actuator which is integral with a quarter rib, and a support stand which is stored in the barrel.

A video camera recording device having a gunstock and a support structure for which includes a mounting platform adapted to receive thereon a hand held video camera recorder having a lens structure defining a line of sight, a recording medium for recording video information, and a viewfinder and mounting structure for mounting the viewfinder onto the gunstock. Structure is provided for effecting a sequential activating and deactivating of the video camera recording device for the purpose of starting a recording of video information onto the recording medium and stopping the recording, respectively. A gun sight is located in the line of sight so as to be visible through the viewfinder when the video camera recorder is recording video information on the recording medium. A trigger is provided on the gunstock and is adapted to be manually activated by a finger of a user's hand. A signal generator is provided which generates a signal visible through the viewfinder in response to the user activating the trigger. The signal is also simultaneously recorded on the recording medium.

A hand held weapon simulating a rifle, shotgun or pistol having a camera mounted in the area of the usual projectile insertion and ejecting mechanism which has its shutter, focus and f adjustment means mounted in or adjacent the firing chamber which camera is actuated by trigger action of the weapon for taking pictures through the barrel of the weapon. A cover is pivotally mounted on either the camera or frame of the weapon for exposing the film for the camera loading and unloading purposes.

SUMMARY OF THE PRESENT INVENTION

The present invention relates generally to cameras and, more specifically, to a rifle style camera used for hunting and producing both photographs and three dimensional replicas of images viewed with the camera.

A primary object of the present invention is to provide a rifle style camera that will overcome the shortcomings of prior art devices.

Another object of the present invention is to provide a rifle style camera which is able to take pictures of animals during a hunting exposition.

An additional object of the present invention is to provide a rifle style camera which is able to determine a range at which the animal to be pictured is from the camera.

A further object of the present invention is to provide a rifle style camera which is able to take a plurality of data image pictures of a target animal and extrapolate from the data to produce a three dimensional replica of the target animal.

A yet further object of the present invention is to provide a rifle style camera which looks and feels like an actual rifle.

A still further object of the present invention is to provide a rifle style camera rifle style camera which is connectable to a microprocessor for storage and processing of the data image.

An even further object of the present invention is to provide a rifle style camera which is able to produce 35 mm. pictures.

Another object of the present invention is to provide a rifle style camera that is simple and easy to use.

A still further object of the present invention is to provide a rifle style camera that is economical in cost to manufacture.

Additional objects of the present invention will appear as the description proceeds.

A rifle style camera supplied with power by an internal power supply for producing at least one of a photograph on a film material and digital data representative of an object is disclosed by the present invention. The rifle style camera includes a stalk and a barrel extending from the stalk and including a top side and a bottom side. A housing is connected to the bottom side of the barrel. A camera for producing the photograph of the object on the film and a digital image processor including a memory device for capturing a digital image of the object, producing the digital data representative of the object from the captured digital image and storing the produced digital data in the memory device are positioned within the housing and connected to receive power from the internal power supply. A view finder is mounted to the top side of the barrel and connected to both the photographic camera and the digital image processor. An eyepiece is connected to the view finder for viewing the object therethrough. A trigger shutter release is connected to the bottom side of the barrel and adjacent the housing. The trigger shutter release is operable between a first closed position in which the film is not exposed to light for capturing a photograph of the object thereon and a second open position for exposing the film to light for capturing the object on the film and initiating capture of an image of the object for processing by the digital image processor.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
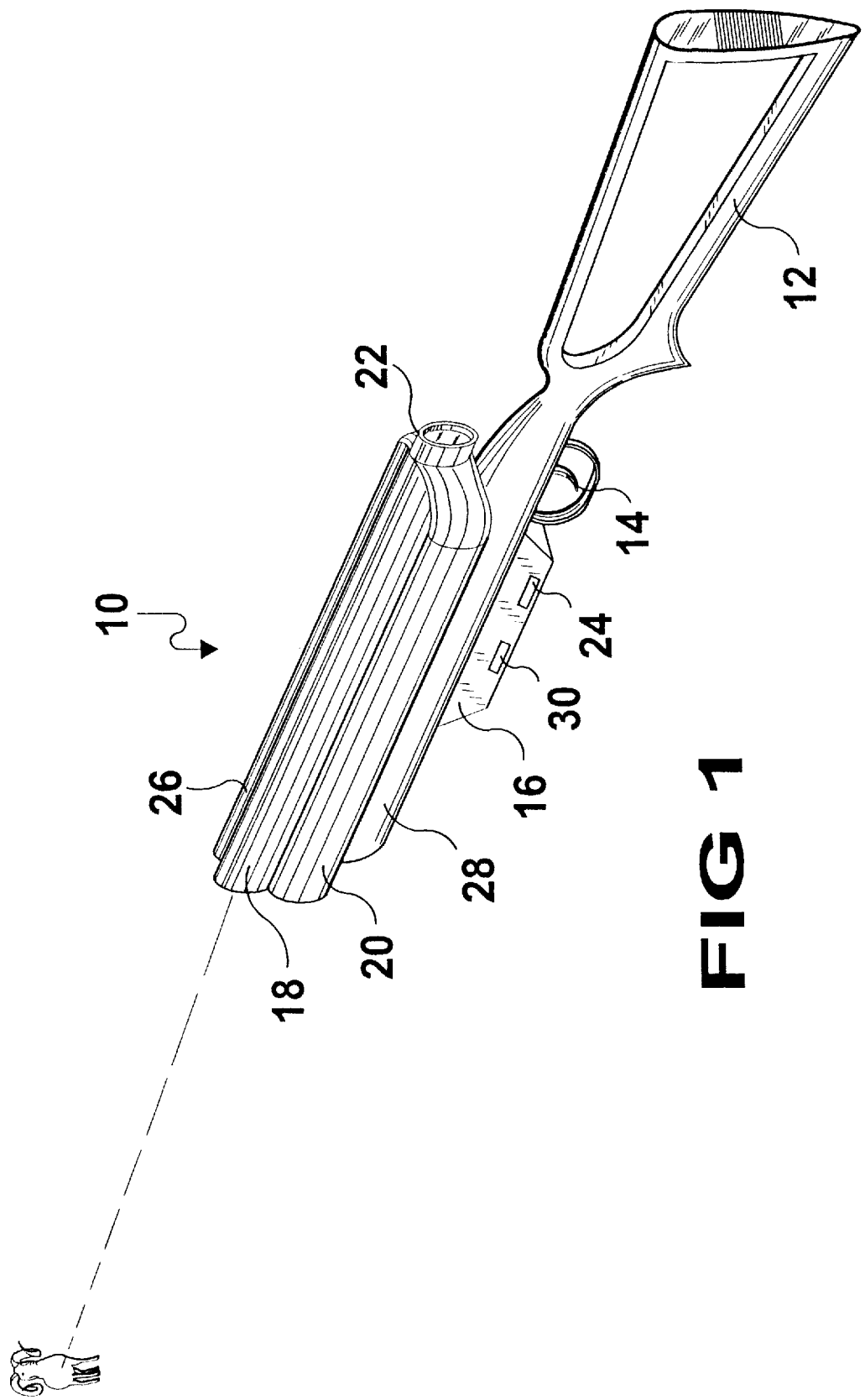
FIG. 1 is an elevated perspective view of the rifle style camera of the present invention.

Turning now descriptively to the drawings, in which similar reference characters denote similar elements throughout the several views, the Figures illustrate a rifle style camera of the present invention. With regard to the reference numerals used, the following numbering is used throughout the various drawing figures.
10 rifle style camera of the present invention
12 stalk
14 trigger/shutter release
16 housing containing both photographic and digital cameras
18 lens/view finder for both photographic and digital cameras
20 infrared range finder signal transmitter
22 eyepiece
24 power switch
26 infrared range finder signal receiver
28 barrel
30 data output ports
32 external power source for peripheral devices
34 computer microprocessor
36 monitor
38 keyboard
40 printer
42 input ports
44 power source
46 camera microprocessor
48 memory
50 router table and extrapolator
52 date stamp
54 film
58 picture
60 digital image
62 extrapolated image
64 time stamp
66 range/distance indicator
68 router table for producing replica horns

DETAILED DESCRIPTION OF THE PREFERRED EMBODIMENT

Turning now descriptively to the drawings, in which similar reference characters denote similar elements throughout the several views, FIGS. 1 through 6 illustrate a rifle style camera indicated generally by the numeral 10.

The rifle style camera 10 includes a stalk 12 and a barrel 28. The stalk 12 is conventional in shape, preferably hollow and made of at least one of a light weight material such as fiberglass, graphite and any other composite. However, the stalk 12 may be formed of any material which is able to perform the functions necessary and the material from which the stalk 12 is formed is not meant to limit the scope of the present invention.

The barrel 28 extends from the stalk 12 and includes a trigger 14 extending from an underside thereof. Also extending from an underside therefrom and adjacent the trigger 14 is a housing 16 including both a photographic camera and digital camera or digital image processor. The camera is preferably a 35 mm camera although any camera able to produce photographs and fit within the housing 16 may be used with the present invention.

On the opposing side of the barrel 28 is a lens/view finder 18 for both the photographic camera and the digital camera. A user looks through the eyepiece 22 to view the image to be captured by the photographic camera and digital camera through the lens/view finder 18. Also mounted adjacent the lens/view finder 18 is an infrared range finder signal transmitter 20 and infrared range finder signal receiver 26 for determining a range at which the object to be photographed is distanced from the rifle style camera 10. The trigger 14 acts as a shutter release for taking a picture by exposing the film and initiating capture of the image viewed through the lens/view finder 18 for storage in a memory device connected to a microprocessor contained within the housing 16 and described hereinafter. A power switch 24 exists on the wall of the housing 16 for supplying power from an internal power supply to the photographic camera and the digital camera. Output ports 30 for connection of the digital camera to a peripheral device such as a computer are also provided on the walls of the housing 16.

Figure 2:
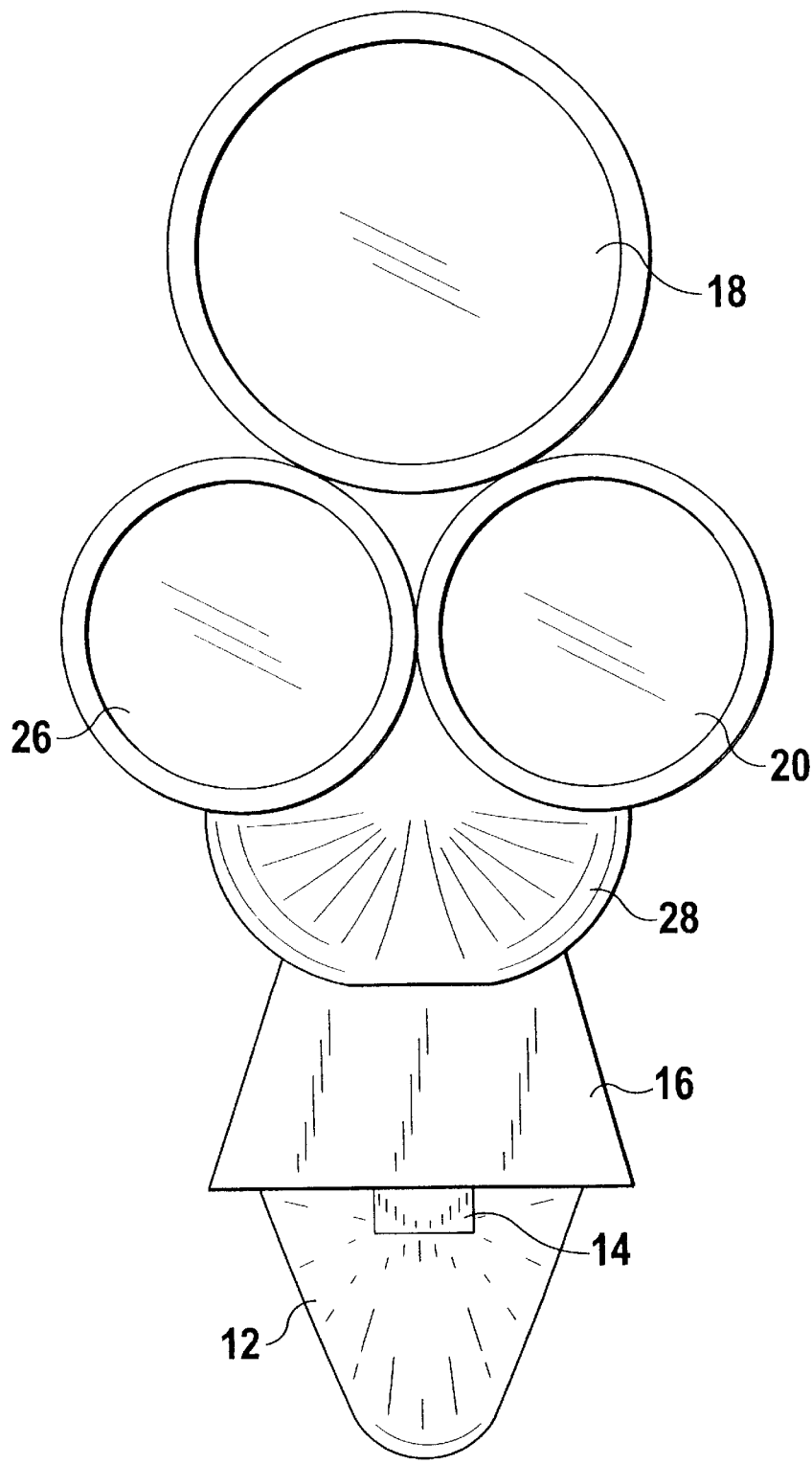
FIG. 2 is a front view of the rifle style camera of the present invention.

FIG. 2 illustrates a view of the rifle style camera of the present invention looking straight into the barrel 28. The lens/view finder 18 of both the photographic camera and the digital camera and the infrared range finder signal transmitter and receiver 20 and 26 are clearly depicted by this view.

Figure 3:
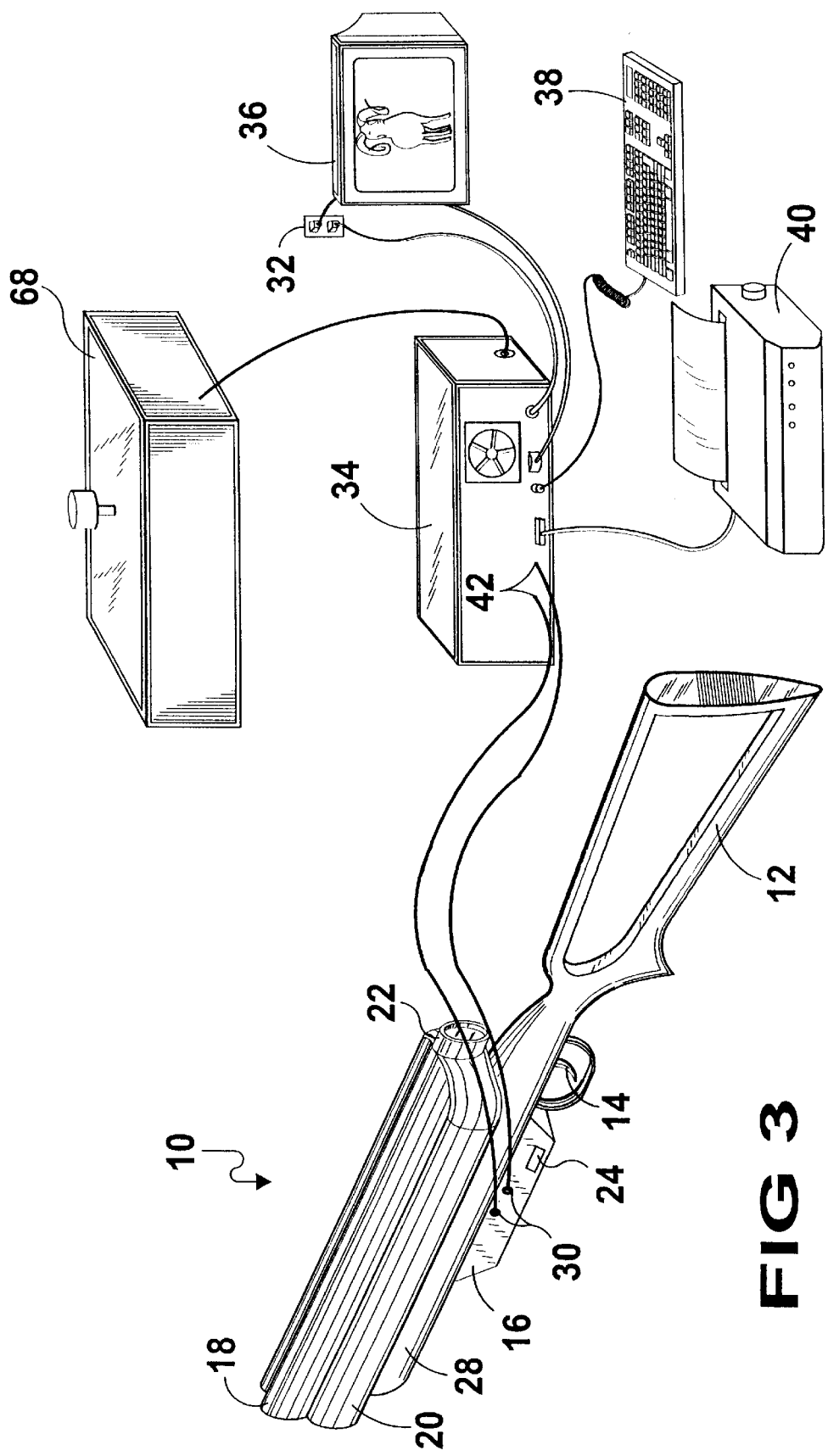
FIG. 3 is a perspective view of the rifle style camera of the present invention connected to a plurality of peripheral devices for displaying and recreating a three dimensional replica of an image stored therein.
Figure 5B:
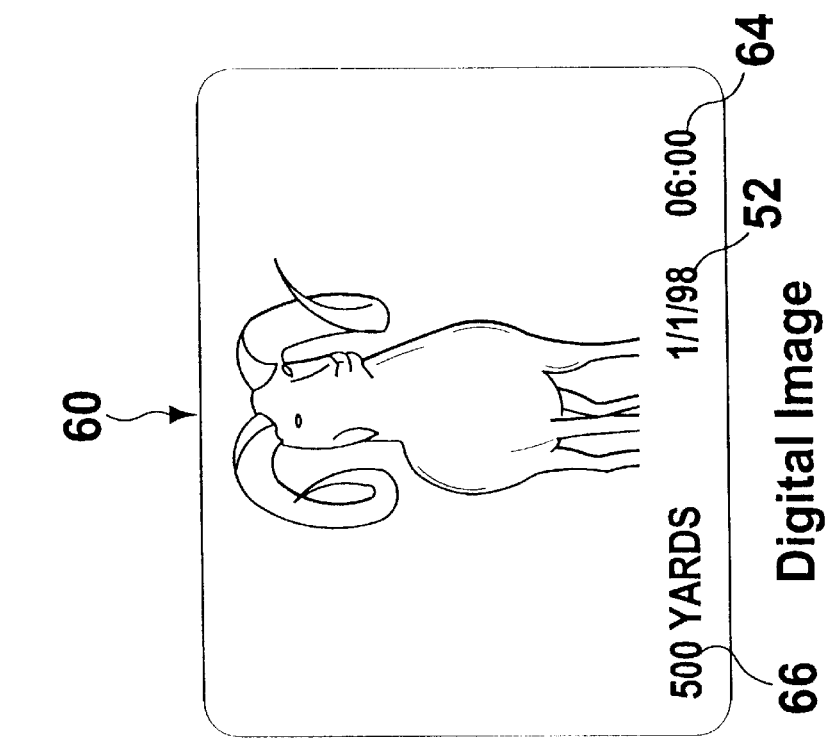
FIG. 5 is an illustration showing images produced by the rifle style camera of the present invention.
Figure 5A:
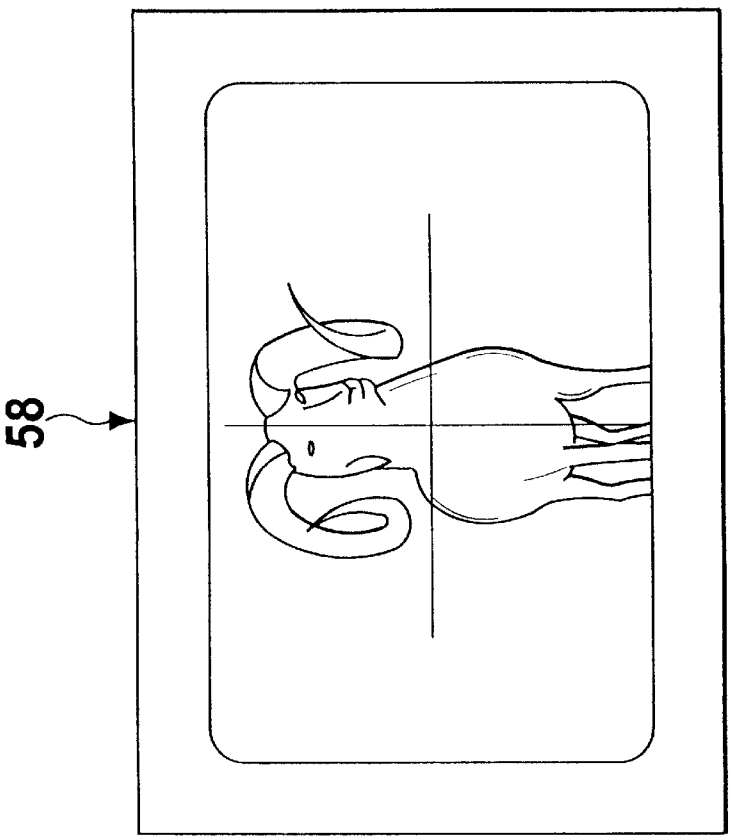
Figure 6:
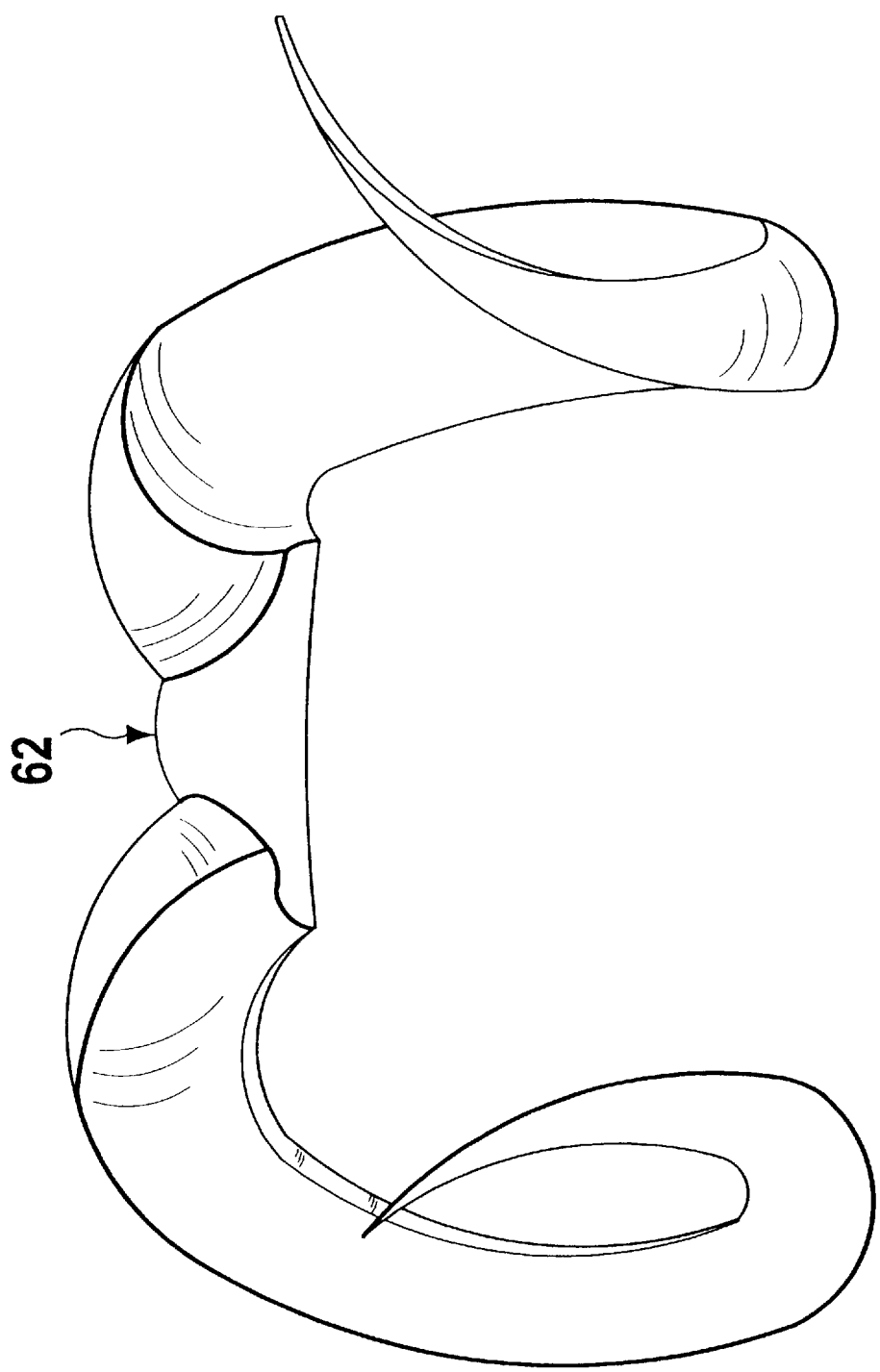
FIG. 6 is a perspective view of a pair of horns reproduced by the rifle style camera of the present invention.

Connection of the rifle style camera 10 of the present invention to a number of peripheral devices is illustrated in FIG. 3. The rifle style camera 10 is connected via the output ports 30 of the digital camera to a microprocessor 34 for downloading data relating to the images stored within the digital camera of the rifle style camera 10. The microprocessor 34 may be connected to a display monitor 36, a keyboard 38, a printer 40 and a router table 68 for displaying the images stored within the digital camera and reproducing a three dimensional replica of the captured images. An external power source 32 such as a wall outlet is needed to supply power to the peripheral devices. An exemplary picture 58 taken by the photographic camera is illustrated in FIG. 5A while FIG. 5B illustrates an identical image 60 captured by the digital camera. The image produced by the digital camera includes a date stamp 52, a time stamp 64 and a distance/target range indicator 66 indicating the distance of the object photographed from the rifle style camera 10. FIG. 6 illustrates an extrapolated partial three dimensional replication 62 of the object photographed after processing of the data stored in the digital camera.

Figure 4:
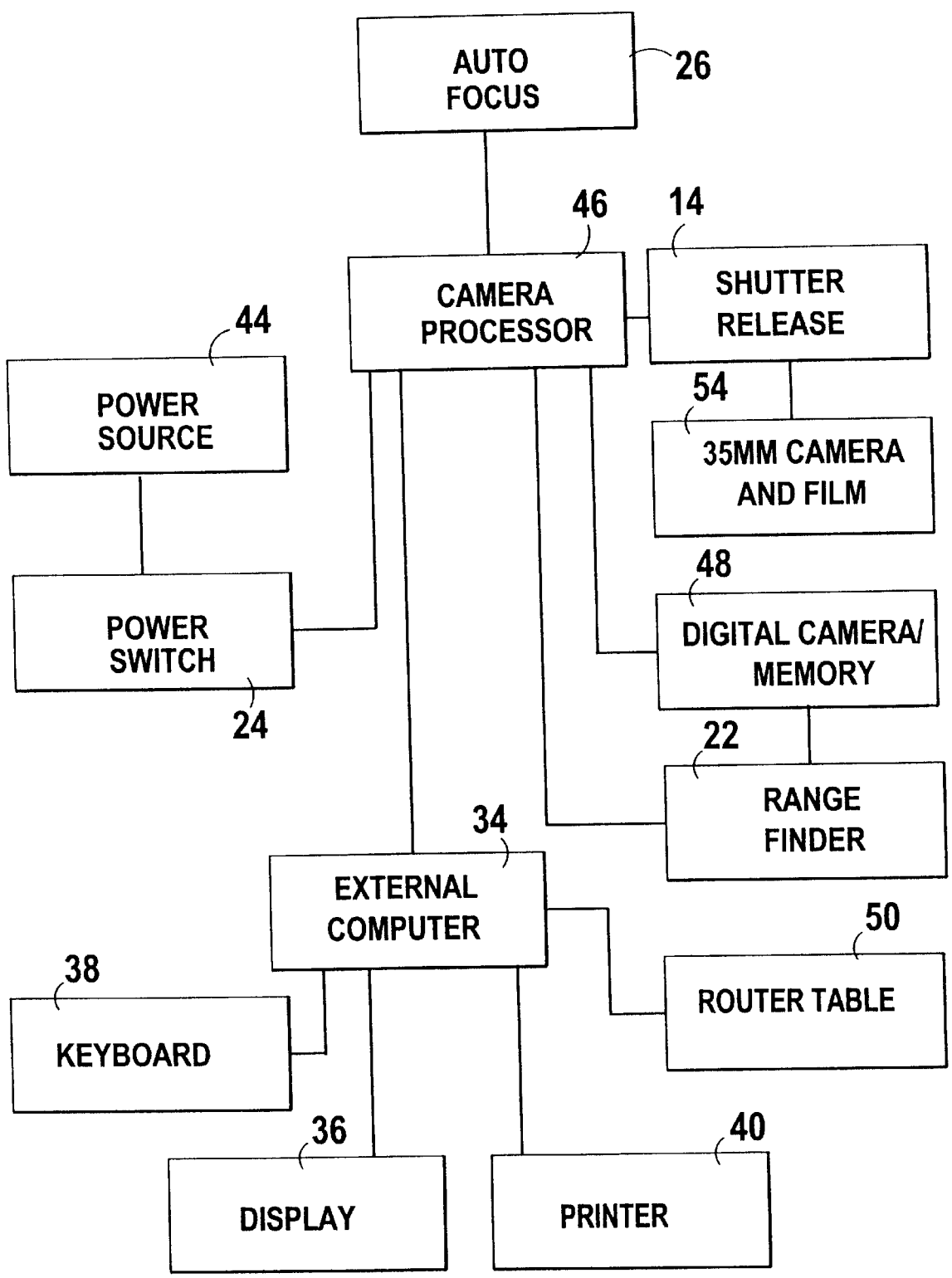
FIG. 4 is a schematic diagram of the rifle style camera of the present invention.

A schematic diagram of the rifle style camera of the present invention including connections to associated peripheral devices is illustrated in FIG. 4. The rifle style camera 10 includes a camera processor 46 which is supplied power from an internal power source 44 via the power switch 24. An auto focus mechanism 26 is also connected to the camera processor 46 for focusing the image viewed through the lens/view finder 18. The trigger 14 acting as a shutter release exposes the film of the photographic camera 54 to light causing a picture to be taken when pulled and also causes the digital camera to initiate capture of the object and the camera processor to produce a digital image of the captured object as seen through the lens/view finder 18 for storage in a digital camera/memory device 48 connected thereto. The camera processor 46 is also connected to the infrared range finder 22 which determines a distance at which the object photographed is positioned from the rifle style camera 10 for indication on the digital image and for use by the numerous other peripheral devices when reproducing and displaying the digital image stored in the memory.

Figure 7:
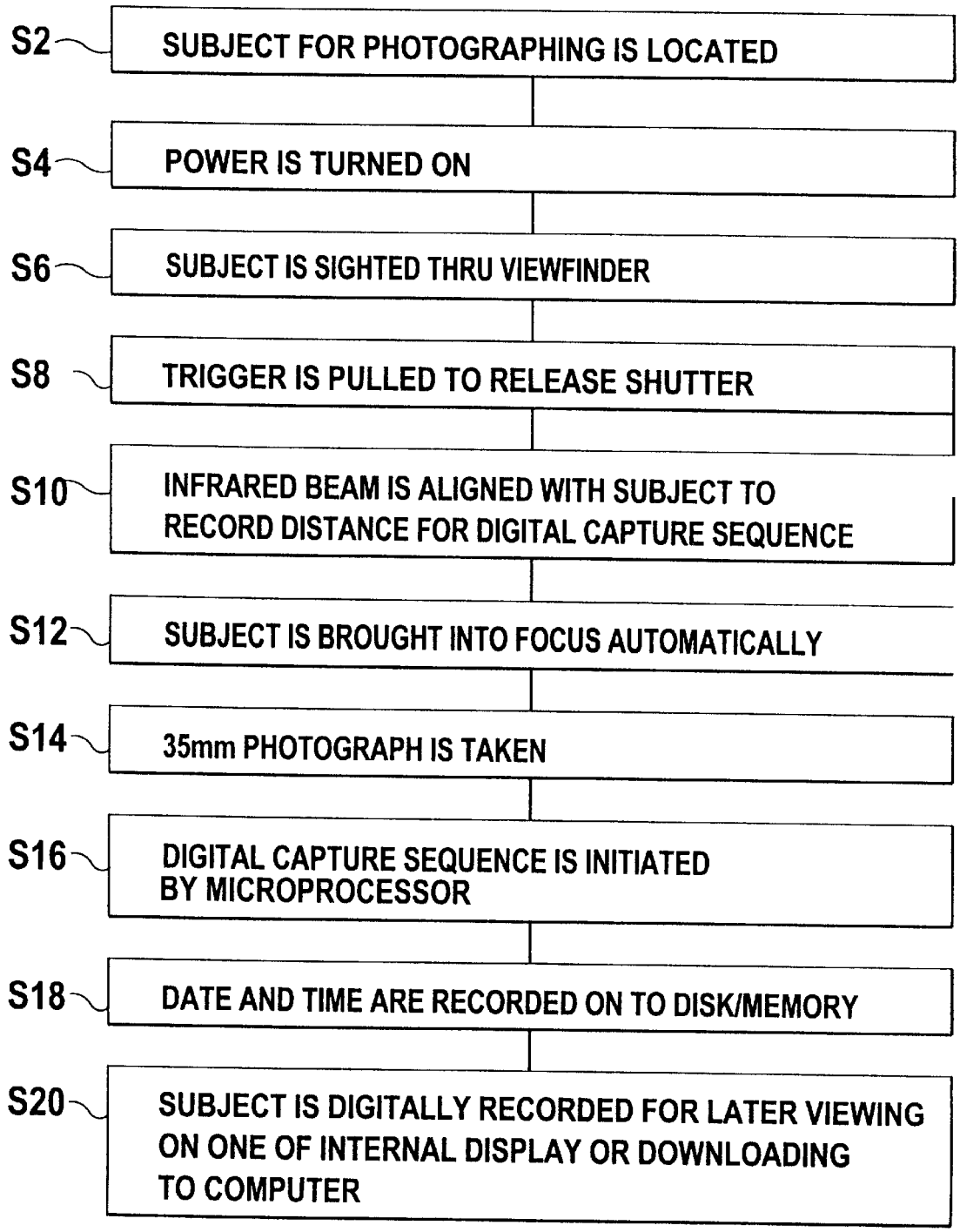
FIG. 7 is a flow chart describing operation of the rifle style camera of the present invention.

The operation of the rifle style camera of the present invention will now be described with specific reference to FIG. 7. In operation, an object to be photographed is located as described in step S2. Upon locating the object, the power switch on the rifle style camera is turned to the on position as stated in step S4 and the subject is sighted through the view finder of both the photographic camera and the digital camera in step S6.

The infrared range finder device is activated by aligning the infrared beam with the subject for determining the distance of the subject from the rifle style camera and the object is then brought into focus automatically as the trigger is pulled to release the shutter, step S8. The distance determined by the infrared range finder device will be recorded with the digital image when captured for storage, step S10. Infrared range finders are well known in the art and any such range finder may be used with the present invention. The preferred range finder used with the present invention transmits a laser light signal towards the object and, based upon the time taken for the laser light beam to be reflected back to the infrared range finder, the distance of the object from the camera is determined. The film for the photographic camera is now exposed to the light and the image is recorded on the film as stated in step S12.

Capture of the image by the camera processor is also initiated by activating the trigger for storage in the memory device along with the predetermined range and a date and time stamp as described in steps S14, S16 and S18. It is also possible to disconnect either the photographic camera or the digital camera and only produce an image on one medium. The digital recording may be viewed either instantly through the lens/view finder 18 or at a later time by connection of an external computer to the output ports on the camera and downloading the digital images stored on the cameras memory thereto.

The digital data downloaded to the computer may then be used to view the image on a display device, print the image on a printer or even, using router tables and known extrapolation methods, produce a three dimensional replica of the image captured by the digital camera as stated in step S20. The three dimensional replica produced will not necessarily be the entire image but may only be a partial image as shown in FIG. 6. By connecting a router table to the external computer and transmitting the data representative of the image to the router table a three dimensional replica of all or part of the image may be produced. Use of a router table in this manner is well known and thus further discussion of such is not necessary.

From the above description it can be seen that the rifle style camera of the present invention is able to overcome the shortcomings of prior art devices by providing a camera which is able to take both photographic pictures and produce digital images of animals during a hunting exposition. The rifle style camera is also able to determine a range at which the animal to be pictured is from the camera and take a plurality of data image pictures of a target animal and extrapolate from the data to produce a three dimensional replica picture of the target animal. The rifle style camera of the present invention also looks and feels like an actual rifle, is connectable to a microprocessor for storage and processing of the data image and is also able to produce 35 mm. pictures. Furthermore, the rifle style camera of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rifle style camera system comprising:
   a) a stalk;
   b) a barrel extending from said stalk and including a top side and a bottom side;
   c) a housing connected to said bottom side of said barrel;
   d) a photographic camera positioned within said housing and connected to receive power from an internal power supply for producing an image of an object on film;
   e) a digital camera including a memory device positioned within said housing and connected to receive power from the internal power supply for capturing a digital image of said object producing the digital data representative of the object from the captured digital image and storing said produced digital data in said memory device;
   f) a view finder mounted on said top side of said barrel and connected to both said photographic and digital cameras;
   g) a trigger shutter release connected to said bottom side of said barrel and adjacent said housing, said trigger shutter release being operable between a first closed position in which the film is not exposed to light for capturing a photograph of the object thereon and a second open position for exposing the film to light for capturing the object on the film and initiating capture of an image representative of the object by said digital camera;
   h) an infrared range finder signal transmitter and an infrared range finder signal receiver mounted above said barrel in side by side relationship under said view finder for determining the range at which the object to be photographed is distanced from said cameras forming an arrangement which looks and feels like an actual rifle;

i) means for downloading data from said digital camera relating to the images stored within said digital camera comprising an output port of said digital camera mounted on the outside of said housing and a computer external to said rifle style camera for receiving the downloaded data; and j) means connected to said computer for displaying the images produced by said digital camera.

2. The rifle style camera system of claim 1 in which said displaying means includes a printer and a monitor.

3. The rifle style camera system of claim 1 in which said displaying means includes a router table for producing a three dimensional replication of the digital images.

* * * * *